(12) United States Patent
Vatidis et al.

(10) Patent No.: US 11,409,561 B2
(45) Date of Patent: Aug. 9, 2022

(54) SYSTEM AND METHOD FOR SCHEDULE OPTIMIZATION

(71) Applicant: Hubstar International Limited, London (GB)

(72) Inventors: Stefanos Vatidis, London (GB); Denis Mequinion, London (GB)

(73) Assignee: Hubstar International Limited, London (GB)

(*) Notice: Subject to any disclaimer, the term of this patent is extended or adjusted under 35 U.S.C. 154(b) by 0 days.

(21) Appl. No.: 17/015,398

(22) Filed: Sep. 9, 2020

(65) Prior Publication Data
US 2022/0035671 A1 Feb. 3, 2022

Related U.S. Application Data

(63) Continuation of application No. 16/944,659, filed on Jul. 31, 2020, now abandoned.

(51) Int. Cl.
*G06F 9/50* (2006.01)

(52) U.S. Cl.
CPC ................. *G06F 9/5011* (2013.01)

(58) Field of Classification Search
CPC .... G06F 9/5011; G06F 9/5038; G06F 9/5061; G06F 2209/503
See application file for complete search history.

(56) References Cited

U.S. PATENT DOCUMENTS

| | | |
|---|---|---|
| 5,124,912 A | 6/1992 | Hotaling et al. |
| 5,325,525 A | 6/1994 | Shan et al. |
| 7,343,312 B2 | 3/2008 | Capek et al. |
| 7,343,313 B2 | 3/2008 | Dorenbosch et al. |
| 7,912,745 B2 | 3/2011 | Mansour |

(Continued)

FOREIGN PATENT DOCUMENTS

| | | |
|---|---|---|
| EP | 0276424 | 8/1988 |
| EP | 0276426 | 8/1988 |

(Continued)

OTHER PUBLICATIONS

Russell et al. "Managing Project Value Budgets and costs" Technical Project Management in Living and Geometric Order. 2018, pp. 1-31 (Year: 2018).*

*Primary Examiner* — Meng Ai T An
*Assistant Examiner* — Willy W Huaracha
(74) *Attorney, Agent, or Firm* — Dority & Manning, P.A.

(57) ABSTRACT

A computer-implemented method including: obtaining resource availability data indicative of a set of one or more resources available at a future time period, wherein the set of one or more resources are allocable to a plurality of resource users; obtaining requirements data indicative of a requirement for a subset of the plurality of resource users to have access to a subset of the set of one or more resources; and generating a resource allocation plan for the future time period based on the resource availability data and the requirements data. Generating the resource allocation plan includes allocating, to the subset of the plurality of resource users, the subset of the set of one or more resources; and allocating, to one or more other resource users of the plurality of resource users, at least a portion of the resources remaining from the set of one or more resources.

19 Claims, 5 Drawing Sheets

(56) References Cited

U.S. PATENT DOCUMENTS

| | | |
|---|---|---|
| 8,244,568 B2 | 8/2012 | Baron et al. |
| 8,346,589 B1 | 1/2013 | Norton et al. |
| 8,718,254 B2 | 5/2014 | Yasrebi et al. |
| 9,081,627 B1* | 7/2015 | Blanding ............... G06F 9/4881 |
| 9,578,080 B1* | 2/2017 | Vermeulen ........... G06F 9/5011 |
| 9,626,659 B2 | 4/2017 | Bathiya |
| 9,986,580 B2* | 5/2018 | Leung ............... H04W 72/0453 |
| 10,614,424 B1 | 4/2020 | Malinowski et al. |
| 2002/0174185 A1 | 11/2002 | Rawat et al. |
| 2003/0028582 A1 | 2/2003 | Kosanovic |
| 2003/0149606 A1 | 8/2003 | Cragun et al. |
| 2004/0064355 A1 | 4/2004 | Dorenbosch et al. |
| 2004/0088362 A1 | 5/2004 | Curbow et al. |
| 2004/0117804 A1* | 6/2004 | Scahill .................. H04L 69/329 719/320 |
| 2005/0022251 A1 | 1/2005 | Ohnuma et al. |
| 2005/0102245 A1 | 5/2005 | Edlund et al. |
| 2005/0222884 A1 | 10/2005 | Ehret et al. |
| 2006/0253472 A1* | 11/2006 | Wasserman ........... G06Q 10/06 |
| 2006/0293943 A1 | 12/2006 | Tischhauser et al. |
| 2007/0143168 A1 | 6/2007 | Plas |
| 2007/0156434 A1* | 7/2007 | Martin .................. G06F 16/51 705/1.1 |
| 2007/0239507 A1 | 10/2007 | Madhogarhia |
| 2009/0018878 A1 | 1/2009 | Baron et al. |
| 2009/0083105 A1 | 3/2009 | Bhogal et al. |
| 2009/0083112 A1 | 3/2009 | Bhogal et al. |
| 2009/0228321 A1 | 9/2009 | Srinivasan et al. |
| 2010/0121665 A1 | 5/2010 | Boyer |
| 2010/0146058 A1 | 6/2010 | Naef |
| 2012/0005261 A1 | 1/2012 | Pandey et al. |
| 2012/0278129 A1 | 11/2012 | Salomatin et al. |
| 2013/0179211 A1 | 7/2013 | Murphy, Jr. et al. |
| 2014/0237041 A1 | 8/2014 | Bhat et al. |
| 2015/0142493 A1 | 5/2015 | Lakritz et al. |
| 2015/0169371 A1* | 6/2015 | Yarvis ................... G06Q 10/10 718/104 |
| 2015/0193739 A1 | 7/2015 | Min et al. |
| 2016/0078410 A1 | 3/2016 | Horton |
| 2016/0180259 A1 | 6/2016 | Marianko et al. |
| 2016/0217432 A1 | 7/2016 | Yavor et al. |
| 2016/0239808 A1 | 8/2016 | Ryu |
| 2017/0140340 A1 | 5/2017 | Chattopadhyay et al. |
| 2017/0364334 A1 | 12/2017 | Liu et al. |
| 2018/0089634 A1 | 3/2018 | Cannons |
| 2018/0107987 A1 | 4/2018 | Mackenzie et al. |
| 2018/0189743 A1 | 7/2018 | Balasubramanian et al. |
| 2019/0019127 A1 | 1/2019 | Anderson et al. |
| 2019/0043021 A1 | 2/2019 | Yavor et al. |
| 2019/0159256 A1* | 5/2019 | Talarico ................ H04L 1/1887 |
| 2019/0295020 A1 | 9/2019 | Gupta et al. |
| 2019/0333024 A1 | 10/2019 | Adamson et al. |
| 2020/0210965 A1 | 7/2020 | Garber et al. |
| 2020/0258051 A1 | 8/2020 | Ma |
| 2020/0258052 A1 | 8/2020 | Goyal |
| 2021/0232428 A1* | 7/2021 | Rehman ............... G06F 9/4812 |

FOREIGN PATENT DOCUMENTS

| | | |
|---|---|---|
| EP | 0276429 | 8/1988 |
| WO | WO 2015/102843 | 7/2015 |
| WO | WO 2018/071277 | 4/2018 |

* cited by examiner

SYSTEM AND METHOD FOR SCHEDULE OPTIMIZATION

TECHNICAL FIELD

The present disclosure relates to systems and methods for resource allocation. In particular, but without limitation, this disclosure relates to systems and method for allocating resources to users.

BACKGROUND

Resource allocation systems facilitate the allocation of resources to users at a future time period by generating a resource allocation plan. Existing resource allocation solutions allocate resources to users primarily on a first come, first served basis rather than being responsive to user requirements and preferences. Furthermore, these solutions often prevent longer term scheduling, e.g. only allow resource allocation to be planned over a highly limited time horizon such as a day or a week, hindering capacity planning and reducing visibility.

SUMMARY

Aspects described herein improve resource allocation by utilizing data detailing user requirements and preferences. These improvements in resource allocation facilitate efficient use of limited resources such as computational processing power, 3D printers, laboratory equipment, network bandwidth and workspace. The improved resource allocation systems and methods provided may further facilitate resource allocation that complies with safety-critical constraints, such as social distancing requirements and fire safety rules.

According to a first aspect, there is provided a computer-implemented method for allocating resources. The provided computer implemented method includes obtaining resource availability data indicative of a set of one or more resources available at a future time period, wherein the set of one or more resources are allocable to a plurality of resource users; obtaining requirements data indicative of a requirement for a subset of the plurality of resource users to have access to a subset of the set of one or more resources; and generating a resource allocation plan for the future time period based on the resource availability data and the requirements data. Generating the resource allocation plan may include allocating, to the subset of the plurality of resource users, the subset of the set of one or more resources; and allocating, to one or more other resource users of the plurality of resource users, at least a portion of the resources remaining from the set of one or more resources.

The allocation of the subset of resources to the first one or more resource users ensures that these resource users have access to the subset resources that they require (as indicated by the requirements data). This prioritizes the allocation of users that have specified requirements. Furthermore, the allocation of the subset of resources to the first one or more resource users reduces the number of users and resources that must be allocated at each step, thereby reducing computationally complexity of the allocation, and means that the resources may be allocated without using computationally expensive allocation and/or optimization methods. The requirements data may include resource requirements data indicative of a requirement for a first one or more resources users of the subset of the plurality of resource users to have access to specified resources of the first subset of the set of one or more resources. Allocating the subset of the set of one or more resources may include allocating, to the first one or more resource users of the subset of the plurality of resource users, the specified resources of the first subset of the set of one or more resources.

The allocation of the specified resources to the first one or more resource users ensures that these resource users have access to the specified resources that they require. Furthermore, the allocation of the specified resources to the first one or more resource users is a static allocation that does not require the use of computationally expensive allocation and/or optimization methods, and means that the specified resources may be allocated without using such computationally expensive methods. Consequently, the proportion of the set of the one or more resources allocated using such computationally expensive methods is reduced and, thus, the computational resources used to allocate the set of resources is reduced. The reduction in computational savings may be substantial as such computationally expensive methods may increase superlinearly relative to the amount of resources being allocated using them.

The resource availability data may include resource location data indicative of a resource location of the set of the one or more resources, and the requirements data may include calendar data indicative of an obligation for a second one or more resource users of the subset of the plurality of resource users to be proximate to the resource location. Allocating the subset of the set of one or more resources may include allocating, to the second one or more resource users of the subset of the plurality of resource users, at least a portion of the resources remaining from the first subset of the set of one or more resources.

As the second one or more resource users have an obligation to be at the resource location, allocating the second one or more resource users resources proximate to the resource location ensures that they can fulfil their obligation while having access to the resource required to perform their role. Furthermore, the options for the allocation of resources to the second one or more resource users are constrained comparative to others of the resource users that do not have the same obligations. As the allocation of resources may be performed by computationally expensive methods that scale superlinearly with the available options, this constraining of the options may result in a (superlinear) saving in computational resource usage.

The requirements data may include contingency requirements data indicative of an amount or proportion of the set of one or more resources that should be left unallocated as contingency resources at the future time period. Allocating the subset of the set of one or more resources comprises allocating the amount or proportion of the set of one or more resources as contingency resources. The amount or proportion of the set of one or more resources that should be left unallocated as contingency resources at the future time period may be based on a length of time between a current time and the future time period.

Allocating an amount or proportion of the set of one or more resources as contingency resources may reduce the frequency at which resource allocation plans are updated and/or regenerated, as, by including an amount of contingency resources, these resources can be allocated as new resource needs arise rather than requiring a reallocation of previously allocated resources. This reduction in the frequency of updates and/or regenerations of the resource allocation plans may save computational resources, which would have been used for such updates and/or regenerations.

Network bandwidth that would have been used to communicate the changes to the resource allocation plan may also be saved. Basing the amount or proportion allocated as contingency based on the length of time between the current time and the future time period may further reduce the frequency at which previously allocated resources need to be reallocated by ensuring that the amount of contingency reserved is commensurate with the amount of new resource needs expected to arise before the future time period. This further reduction in the need for reallocations may further reduce the frequency of updated and/or regenerations saving further computational resources and/or network bandwidth.

The requirements data may include constraint specification data indicating one or more resource allocation plan constraints. Generating the resource allocation plan may include satisfying the one or more resource allocation plan constraints. The one or more resource allocation plan constraints may include one or more maximum occupancy rules.

Satisfying the one or more resource allocation plan constraints when generating the resource allocation plan may prevent the generation of impossible, illegal, unsafe and/or otherwise undesirable resource allocation plans. Preventing the generation of such resource allocation plans may reduce the frequency at which resource allocation plans are regenerated and/or updated by removing a need to regenerate and/or update impossible, illegal, unsafe and/or otherwise undesirable resource allocation plans that would otherwise be generated. Reducing the need for regenerations and/or updates may save computational resources and/or network bandwidth for the reasons previously given.

Generating the resource allocation plan may include optimizing the resource allocation plan in accordance with one or more optimization criteria.

Optimizing the resource allocation plan may reduce the likelihood of and/or frequency at which a resource allocation plan needs to be regenerated and/or updated; as such, an optimized resource allocation plan is more likely to be acceptable to resource users. Reducing the need for regenerations and/or updates may save computational resources and/or network bandwidth for the reasons previously given.

The computer-implemented method may include obtaining preference data indicating, for each resource user of the one or more other resource users, an indicator as to whether the respective resource user desires one or more resources of the at least a portion of the remaining resources of the set of resources at the future time period. Allocating the at least a portion of the remaining resources of the set of resources is based on the preference data.

Allocating resources based on preferences of resource users may reduce the likelihood of and/or frequency at which a resource allocation plan needs to be regenerated and/or updated in response to feedback, e.g. complaints, from resource users. Reducing the need for regenerations and/or updates may save computational resources and/or network bandwidth for the reasons previously given.

The preference data may include one or more preference query responses received from a client device of at least one of the resource users in response to one or more preference queries sent to the client device.

Sending preference query responses from their client devices may be relatively easy for resource users compared to other methods of inputting their preferences. Furthermore, users are prompted by the preference queries to provide such data. Hence, using preference query responses may increase the amount and contemporariness of the preference data. Thus, the extent to which the resource allocation plan accords with resource user preferences is increased, and the likelihood and/or frequency at which a resource allocation plan needs to be updated and/or regenerated in response to feedback from resource users correspondingly decreased. Reducing the need for regenerations and/or updates may save computational resources and/or network bandwidth for the reasons previously given.

The computer-implemented method may include receiving, from a client device of a resource user of the plurality of resource users, a request for resource allocation information; and sending, to the client device, at least a portion of the resource allocation plan. The at least a portion of the resource allocation plan may include the resource allocation for the resource user.

The computer-implemented method may include generating, based on the resource allocation plan, an updated resource allocation plan for the future time period; comparing the updated resource allocation plan with the resource allocation plan; determining, based on the resource allocation plan, an increased availability of one or more resources; identifying at least one of the one or more other resource users desiring the one or more resources that were not allocated the one or more resources in the resource allocation plan; and sending, to a client device of the at least one of the one or more other resource users, a message indicating the increased availability of the one or more resources. The computer-implemented method may additionally include receiving, from the client device of the at least one of the one or more other resource users; a message confirming a continued desire for the one or more resources; and in response to receiving the message, generating a further updated resource allocation plan for the future time period, wherein there is an increased allocation of the one or more resources to the at least one of the one or more resource users.

By generating the future updated resource allocation plan in response to a confirmation of the continued desire for the one or more resources, incorrect allocations may be reduced, e.g. allocations to resource users who did but no longer desire the one or more users. This reduction in incorrect allocations may reduce the frequency of regenerations and/or updates to the resource allocation plan. Hence, computational resources and/or network bandwidth may be saved for the reasons given above.

According to a second aspect, there is provided a computing system include one or more computing devices. The one or more computing devices include one or more processors. The one or more processors are configured to obtain resource availability data indicative of a set of one or more resources available at a future time period, wherein the set of one or more resources are allocable to a plurality of resource users; obtain requirements data indicative of a requirement for a subset of the plurality of resource users to have access to a subset of the set of one or more resources; and generate a resource allocation plan for the future time period based on the resource availability data and the requirements data. Generating the resource allocation plan may include allocating, to the subset of the plurality of resource users, the subset of the set of one or more resources; and allocating, to one or more other resource users of the plurality of resource users, at least a portion of the resources remaining from the set of one or more resources.

The one or more processors of the one or more computing devices of the computing systems may be further configured to: generate, based on the resource allocation plan, an updated resource allocation plan for the future time period; compare the updated resource allocation plan with the resource allocation plan; determine, based on the resource allocation plan, an increased availability of one or more resources; identify at least one of the one or more other resource users desiring the one or more resources that were not allocated the one or more resources in the resource allocation plan; and send, to a client device of the at least one of the one or more other resource users, a message indicating the increased availability of the one or more resources.

The computing system may include the client device of the at least one of the one or more other resource users. The client device may be configure to, send, to the one or more computing devices, a message confirming a continued desire for the one or more resources in response to one or more user inputs.

The one or more processors of the one or more computing devices of the computing systems may be configured to: receive, from the client device, the message confirming a continued desire for the one or more resources; and generate a further updated resource allocation plan for the future time period, wherein there is an increased allocation of the one or more resources to the at least one of the one or more resource users.

According to a third aspect, there is provided a non-transitory computer-readable medium including instructions that, when executed by a processor, cause the processor to: obtain resource availability data indicative of a set of one or more resources available at a future time period, wherein the set of one or more resources are allocable to a plurality of resource users; obtain requirements data indicative of a requirement for a subset of the plurality of resource users to have access to a subset of the set of one or more resources; and generate a resource allocation plan for the future time period based on the resource availability data and the requirements data. Generating the resource allocation plan may include: allocating, to the subset of the plurality of resource users, the subset of the set of one or more resources; and allocating, to one or more other resource users of the plurality of resource users, at least a portion of the resources remaining from the set of one or more resources.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

The embodiments described herein aim to improve resource allocation by utilizing data detailing user requirements and preferences. Such an improvement in resource allocation facilitates efficient use of limited resources such as computational processing power, 3D printers, laboratory equipment, network bandwidth and workspace. The improved resource allocation systems and methods provided by these embodiments may further facilitate resource allocation that complies with safety-critical constraints, such as social distancing requirements and fire safety rules.

Resource Allocation System

Figure 1:
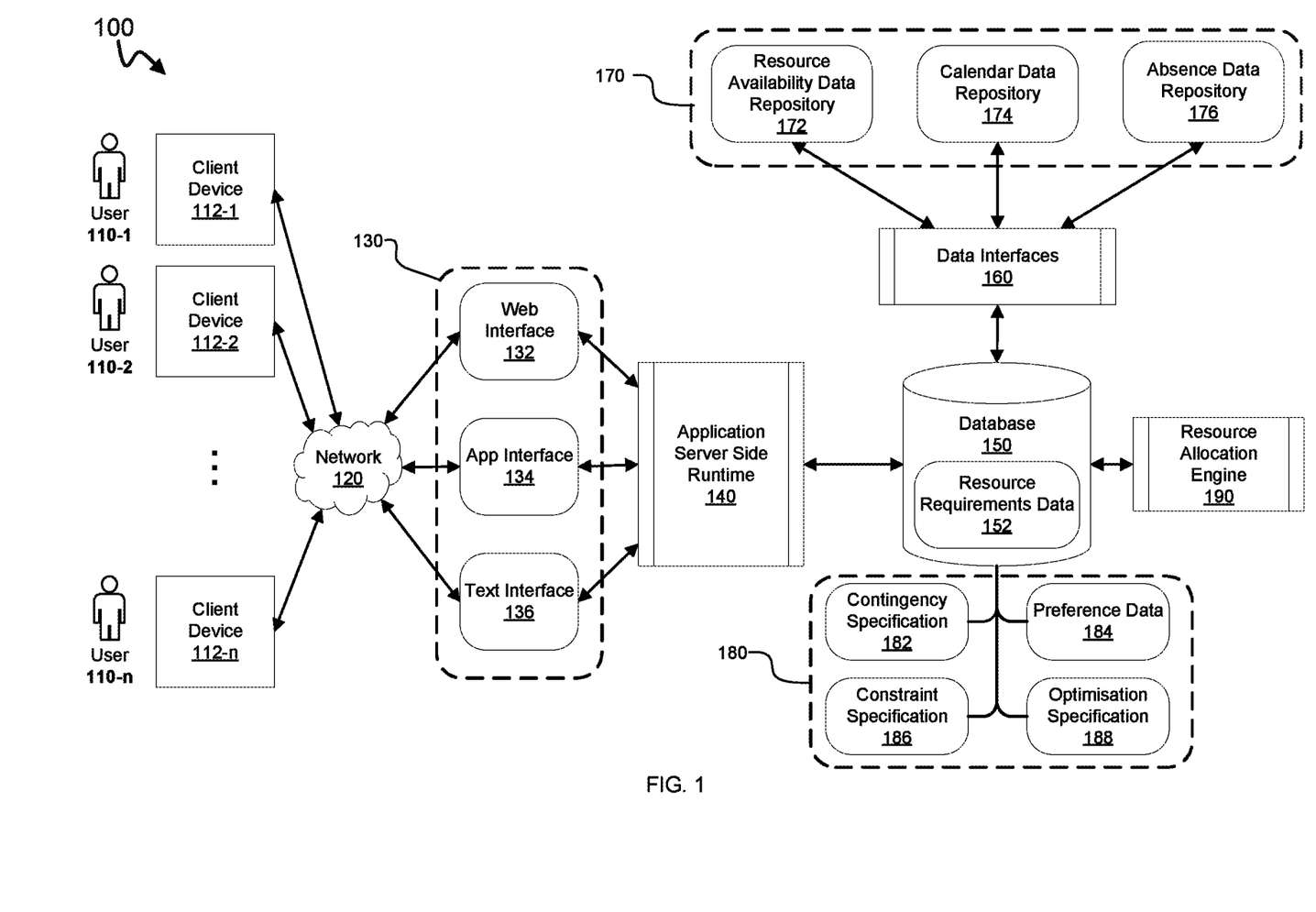
FIG. 1 shows a schematic detailing a computer system for allocating resources in accordance with an embodiment.

FIG. 1 shows a computer system 100 for allocating resources to resource users. The computer system 100 is configured to allocate resources in accordance with resource allocation requirements. The computer system 100 may be further configured to allocate resources in accordance with the preferences of resource users 110.

The computer system 100 includes client devices 112 used by respective resource users 110. The client devices 112 may be any suitable computing devices, e.g. smartphones, tablet computers, laptop computers, desktop computers, feature phones, and/or any other computing device configured to communicate with network 120.

Each of the client devices 112 is utilizable by a respective resource user 110 to indicate resource allocation preferences, e.g. a preference for a resource user to have access to one or more specified resources or types thereof. A respective resource user 110 of the resource users 110 may input these through one or more applications usable on a respective client device 112 of the client devices 112, e.g. a messaging application through which resource preferences messages may be sent, a web browser application showing a resource preference input web page, and/or a native application (e.g. an app) for inputting resource preferences. User interfaces of the one or more application(s) for inputting these preferences may be displayed on a display integrated into or connected to the client device 112.

Each of the client devices 112 may also include one or more applications usable to display resource allocation information, e.g. a resource allocation plan or a part thereof, to the respective user 110. These one or more applications may be any or any combination of a messaging application showing a message indicative of the resource allocation plan or a part thereof, a web browser application showing web content indicative of the resource application plan or a part thereof, or a native application (e.g. an app) showing a resource allocation plan or a part thereof. Each of the client devices 112 may also include one or more applications of any number of the above-mentioned types usable by the user to send a message indicating a new and/or continued desire for one or more resources.

The computer system 100 also includes a network 120. The client devices 112 are connected to the network 120. The network 120 may be any suitable network over which data may be communicated. For example, the network 120 may be any interface over which data may be transferred from the one or more applications to one or more interfaces 130. For example, the network 120 may be any of or any combination of a local area network (LAN), a wireless local area network (WLAN), a wide area network (WAN), a cellular network (e.g. a GSM, 3G, 4G, 5G or CDMA network), an Intranet or the Internet.

The computer system 100 also includes the one or more interfaces 130. The one or more interfaces 130 are configured to act as gateways between messages and/or requests received from the client devices 112, over the network 120, and an application server side runtime 140. The one or more interfaces 130 may be one or more computer programs implemented on a single computing device or over a plurality of computing devices. For example, each of the one or more interfaces may be implemented as individual computer programs and each of the individual computer programs may be hosted on a different computing device, or the one or more interfaces may be implemented as a single computer program hosted on a single computing device. The one or more interfaces may also be separate to, but in communication with, the application server side runtime 140 or may be components of the application server side runtime 140.

The one or more interfaces may include a web interface 132. The web interface may provide functionality of the application server side runtime 140 to the client devices via one or more web pages and/or as a web application. The web interface 132 may receive one or more web protocol requests (e.g. HTTP requests) from a browser application on one of the client devices 112. In response to these web protocol requests, the web interface may retrieve resource allocation information, e.g. a resource allocation plan or part thereof, from the application server side runtime 140, convert these into a web page, web application and/or web data (e.g. REST data) and provide these to the browser application on the one of the client devices 120. The web interface 132 may also receive web protocol messages (e.g. HTTP messages) from one of the client devices 112 indicating resource allocation preferences, e.g. a preference for a resource user to have access to one or more specified resources or types thereof, and input these or a transformation thereof to the application server side runtime 140.

The one or more interfaces 130 may include an app interface 134. The app interface 134 may provide functionality of the application server side runtime 140 to the client devices 112 via one or more services utilizable by native application(s) on the client devices 112. The app interface 132 may receive one or more service requests (e.g. application programming interface (API) requests, representational state transfer (REST) API requests, or Simple Object Access Protocol (SOAP)) requests from a native application on one of the client devices 112. In response to these service requests, the app interface 134 may provide resource allocation information, e.g. a resource allocation plan or part thereof, from the application server side runtime 140, and provide these via service requests on the one of the client devices 120. The app interface 134 may also receive service requests from one of the client devices 112 indicating resource allocation preferences, e.g. a preference for the respective resource user 110 to have access to one or more specified resources or types thereof, and input data indicative of these resource allocation preferences to the application server side runtime 140.

The one or more interfaces 130 may include a text interface 136. The text interface 136 may provide functionality of the application server side runtime 140 to the client devices 112 via messages communicated between the text interface 136 and the client devices 112. The text interface 136 may receive one or more messages (e.g. short message service (SMS) messages, rich communication service (RCS) messages, messaging app messages, social network messages) from one of the client devices 112. In response to these one or more messages, the text interface 136 may provide resource allocation information, e.g. a resource allocation plan or part thereof, from the application server side runtime 140, to the one of the client devices 120 by sending one or more messages detailing and/or summarizing the resource allocation information to the one of the client devices 120. The text interface 136 may also receive messages from one of the client devices 112 indicating resource allocation preferences, e.g. a preference for the respective resource user 110 to have access to one or more specified resources or types thereof, and input these to the application server side runtime 140.

The computer system 100 includes the application server side runtime 140. The application server side runtime 140 may be a computer program, or multiple computer programs, implemented on a single computing device or over a plurality of computing devices. The application server side runtime 140 provides resource allocation information provision and updating functionality. For example, the application server side runtime 140 may access a generated resource allocation plan, e.g. stored in a database 150, and provide the resource allocation plan, a part thereof, or a transformation of the resource allocation plan, or a part thereof, to one or more interfaces in response to requests from one of the interfaces 140, e.g. in response to a request (e.g. an API call and/or service request) from one of the interfaces 140. As another example, the application server side runtime 140 may receive a request from one of the interfaces 140 to add and/or update resource allocation preferences for one or more resource users. In response to the request, the application server side runtime 140 may update preference data 186 stored in the database 150 to add and/or update the resource allocation preferences for the one or more users stored in the database.

The computer system 100 includes the database 150. The data stored in the database 150 includes resource allocation information, e.g. a resource allocation plan. The database 150 provides data storage and access functionality, e.g. functionality whereby data can be written to and read from the database 150. The database 150 may also facilitate the deletion of data from the database. The database 150 may be any combination of software and hardware capable of providing this functionality. For example, the database software may be: a relational database server, e.g. a Standard Query Language (SQL) database server; a NoSQL database server, e.g. a key-value store server, a column store server, a document store server or a graph database server; or a file storage server, e.g. a file transfer protocol. The hardware on which the database software is implemented may be one or more suitable computing devices, e.g. one or more server computing devices and/or one or more computing devices of a cloud computing system.

The database 150 is configured to interact with the application server side runtime such that the application server side runtime 140 may read data from and write data to the database 150. The database 150 may communicate with, e.g. receive data to be written from and provide data to be read to, the application server side runtime 140 over a network of any of the types previously mentioned. The database 150 may communicate using a database specific communication technology, e.g. a database specific protocol, or a widely applicable communication technology, e.g. SOAP or REST service calls. Alternatively or additionally, the database 150 may communicate with the application server side runtime 140 using API calls, interprocess communication and/or shared storage. The aforementioned communication technologies may be particularly applicable when the database 150 and the application server side runtime 140 are hosted on the same computing device.

The database 150 stores requirements data 152. The resource requirements data 152 includes data indicating requirements for one or more resource users to have access to specified resources.

At least some of these requirements may be static requirements for a given resource user to have access to a given resource. An example of a static requirement is a requirement for a given user to have access to a given piece of equipment. For example, a given 3D printer, area of workspace, piece of workspace equipment, or computing device may have been configured for the given user's specific requirements such that it is not readily substitutable by another piece of equipment. For example, a user may be assigned to a specific desk/workspace, e.g. the user cannot be assigned another desk/workspace even if it otherwise matches the user's requirements. For example, the user's role may require access to a given piece of equipment that is located at this desk/workspace; the user's role may require the processing of or access to a significant amount of paper documentation that would be impractical to move between workspaces; the given desks/workspace may be proximal to a user's team that is required for their role; or the desk/workspace may have been adapted for a user having a disability.

At least some of these requirements may be dynamic requirements for a user to have access to one or more resources of a given type and/or meeting certain criteria. An example of a dynamic requirement is a requirement for a user to have access to equipment meeting given criteria, e.g. equipment of a given make or model, or equipment having a certain specification. For example, a user may require access to a microscope or 3D printer of a given make and/or model, or may require computing equipment meeting a minimum specification, e.g. having at least a given amount of RAM and processing power. Another example of a dynamic requirement is a requirement for a user to be assigned to a desk/workspace meeting certain criteria. For example, the user may require a desk/workspace having a certain minimum size or proximate to certain equipment or one or more desks/workspaces allocated to team members. Dynamic requirements differ from static requirements in that when fulfilling dynamic requirements users may be assigned any resource of the given type and/or meeting the certain criteria.

The computer system 100 also includes one or more data interfaces 160. The one or more data interfaces 160 are configured to load data from one or more data repositories 170 into the database 150. The one or more data interfaces 160 may also synchronize changes to the corresponding data loaded into the database 150, e.g. updates to the database by the application server side runtime, back to the external data repositories. The one or more data interfaces 160 may be one or more computer programs implemented on a single computing device or over a plurality of computing devices. For example, each of the one or more interfaces may be implemented as individual computer programs and each of the individual computer programs may be hosted on a different computing device, or the one or more interfaces may be implemented as a single computer program hosted on a single computing device.

Each of the one or more data repositories 170 may be part of the computer system 100 or external to the computer system 100. Each of the data repositories 170 may be implemented using any hardware and/or software combination using which the relevant data can be loaded and provided to the one or more data interfaces. For example, each of the data repositories 170 may be or include a database; flat file storage; application specific data stores; and/or applications for dynamic data generation and/or transformation. Furthermore, in an alternative embodiment, the data repositories 170 are integrated within the database 150 itself. In this case, there may be no need for the data interface 160.

The one or more data repositories 170 include a resource availability data repository 172. The resource availability data repository 172 includes resource availability information for a set of one or more resources, e.g. information about the types of resources available in the set of one or more resources; times when the resources are available; information about amounts of each of the types of resources available in the set of one or more resources; information about the locations of each and/or groups of the available resources; and/or specific properties for each and/or groups of the available resources.

The resources in the set of one or more resources may include, for example: specialized equipment that may be only used by one user at a time, such as a 3D printer or motion capture device; computing devices, e.g. desktop, laptop and tablet computers; data storage, e.g. the amount of data storage available on one or more file storage servers at one or more locations; network capacity, e.g. the amount of network bandwidth available in a local area network and/or a shared Internet connection; equipment, e.g. printers, telecommunication equipment or video conferencing equipment; workspace such as laboratory space or office space, e.g. in terms of physical space or other workspace resources, such as desks; and/or gymnasium space and equipment.

Examples of properties of these resources that may be included in the resource availability information follow. For specialized equipment, the properties of the resources may include the model of the specialized equipment and its suitability for particular tasks, e.g. for a 3D printer, the materials with which it can be used and the maximum print size. For data storage, the properties of the data storage may include a data access bandwidth and latency, and a data storage type, such as whether it is persistent or temporary storage. For a computing device, the properties of the computing device may include the processing power, the memory available, the operating system and the software installed. For network capacity, the properties of the network capacity may include the latency of the network or a part thereof; the type of the network capacity, such as whether it is wired or wireless network capacity; the location of the network capacity, and/or security of the network capacity. For equipment, the equipment properties may include the type of the equipment, the model of the equipment, and/or technical specifications of the equipment, e.g. the number of pages per minute that a printer can print or the video quality (e.g. resolution) of video conferencing equipment. For workspace, the properties may include the type of workspace, the size of the workspace, equipment located in or otherwise associated with the workspace, and the number of people that may simultaneously use the workspace. For workspace resources, such as desks, the properties may include: a number of desks, any associated equipment (in general or for each desk), e.g. whether a phone, video conferencing equipment, multiple monitor setup, and/or a laptop dock is available; size and/or dimensions; and/or whether the desk/workspace is sound isolated. For gymnasium equipment, the properties may include the type of gymnasium equipment; muscle groups associated with gymnasium equipment; a weight of the gymnasium equipment; and a size of the gymnasium equipment.

The one or more data repositories 170 may include a calendar data repository 174. The calendar data repository 174 includes data indicating an obligation for one or more users to be proximate to a resource location at a given time. As the user has an obligation to be at the resource location at the given time, there is a requirement to allocate the user resources proximate to that resource location, for a period including the given time. For example, the calendar data may indicate that the user may have to be in a certain office, e.g. because of a meeting. As the user has an obligation to be located in that office, there is a requirement to allocate the user a desk/workspace and/or equipment in that office. The calendar data repository 174 may be a data store associated with a calendar service and/or application. The data store associated with the calendar service and/or application may be a flat file store, a database, or a data store in a service or application specific calendar data format.

The one or more data repositories 170 may include an absence data repository 176. The absence data indicates that one or more users do not require or desire resources in general and/or proximate to a given resource location.

The absence data repository 176 may include allocation absence data. The allocation absence data indicates that one or more users do not require or desire an allocation of resources at a given time. The allocation absence data may include data indicating that one or more users are not working at a given time because of annual leave absence, sickness absence, non-working days (e.g. for part-time workers) and/or public holidays. The allocation absence data may be sourced from a human resources (HR) system and/or country or region-specific public holiday calendars.

The absence data repository 176 may include location absence data. The location absence data may indicate that one or more users will not be proximate to a resource location at a given time, e.g. in a given office, so do not desire or require resources proximate to that resource location at the given time. The location absence data may include user-specific location absence data, e.g. data indicating that certain users are on a business trip and/or are not present at the location because of a personal requirement to work from home. User-specific location absence data may be sourced from HR systems and/or calendar data. The location absence data may include generic location absence data indicating that that all, most or a group of users cannot be proximate to a resource location. For example, the generic location absence data may indicate that a given office or part thereof, such as a floor or department section, is closed to all or most users, e.g. closed to all users except for a designated staff. An office or part thereof may be closed because of a public holiday, a government mandated closure, or ongoing refurbishments. Generic location absence data may be sourced from a facilities management system, calendar data or a HR system.

Alternatively to providing a separate absence data repository 176, absence data such as allocation absence data and/or location absence data may be sourced from the calendar data repository 174 (e.g. by a user's calendar indicating that they will be absent and therefore do not require or desire an allocation of resources at the given time).

The computer system 100 includes resource allocation configuration data 180. The resource allocation configuration data 180 may be stored in the database 150 and/or may be stored as settings associated with a resource allocation engine 190, e.g. associated registry settings or a configuration file. The resource allocation configuration data 180 is used by the resource allocation engine 190 in generating a resource allocation plan.

The resource allocation configuration data 180 may include contingency specification data 182. The contingency specification data specify an amount and/or proportion of one or more resources that should be left unallocated as contingency resources. This reserves contingency resources for the event that additional resources need to be allocated at short notice.

The contingency specification data may specify different amounts and/or proportions of contingency depending on a length of time between the current time and the future time period for which resources are being allocated in a resource allocation plan. In particular, the amount and/or proportion left unallocated as contingency for the future time period may decrease as the length of time between the current time and the future time period for which resources are being allocated decreases. This allows contingency resources to be allocated to users as the future time period being scheduled approaches. This takes into account the reducing likelihood that the contingency resources will be required as the length of time between the current time and the future time period for which resources are being allocated decreases.

For example, when a resource allocation plan is being generated for a month in the future, a proportion of one or more resources to be left unallocated as contingency may be 30%, while, when a resource allocation plan is being generated for a week in the future, the proportion of one or more resources to be left unallocated as contingency may be 10%.

The resource allocation configuration data 180 may include preference data 184. The preference data may indicate a desire for one or more resources by one or more users, e.g. one or more resources that may assist the one or more users in performing their role better but which are non-essential. For example, a user may have a preference for resources, such as a desk/workspace, at a resource location, such as an office or a particular floor or section thereof, to be allocated to them but may be able to perform their role remotely without these resources. This preference may be related to a particular time or time period, for instance, a user may have a preference to be allocated a particular resource during a particular time period (e.g. a user may prefer to be located at a particular office on a given day of the week).

The resource allocation configuration data 180 may include constraint specification data 186. The constraint specification data 186 may indicate rules and/or other criteria that a resource allocation plan must satisfy. For example, the constraint specification data 186 may include maximum occupancy or density of occupancy for a given set of one or more resources. This may be defined by technical or regulatory requirements, such as health and safety rules. Such rules may include social distancing rules or fire safety rules. For instance, social distancing rules may specify that resource users should not be allocated desks/workspaces that would result in them being less than a given distance (e.g. two meters) apart. Equally, fire safety rules may limit the number of resource users being allocated desks/workspaces in an area associated with a particular fire exit, such that no particular fire exit is likely to be overwhelmed.

The resource allocation configuration data 180 may include optimization specification data 188. The optimization specification data may indicate one or more criteria that are to be optimized when generating the resource allocation plan. These criteria may include: mobility, e.g. changing the desk/workspace that users are assigned to on a regular basis; cost, e.g. minimizing the financial cost of the resource allocation plan while satisfying user resource requirements and preferences; and fairness, e.g. ensuring that over an extended time frame resource users have a similar amount of their preferences satisfied.

The computer system 100 includes the resource allocation engine 190. The resource allocation engine 190 may be a computer program, or multiple computer programs, implemented on a single computing device or over a plurality of computing devices. The resource allocation engine 190 generates a resource allocation plan based on data from the database 150, the one or more data repositories 170, and/or the resource allocation configuration data 180. The resource allocation engine 190 may store the resource allocation plan in the database 150.

Resource Allocation Plan Generation Method

Figure 2:
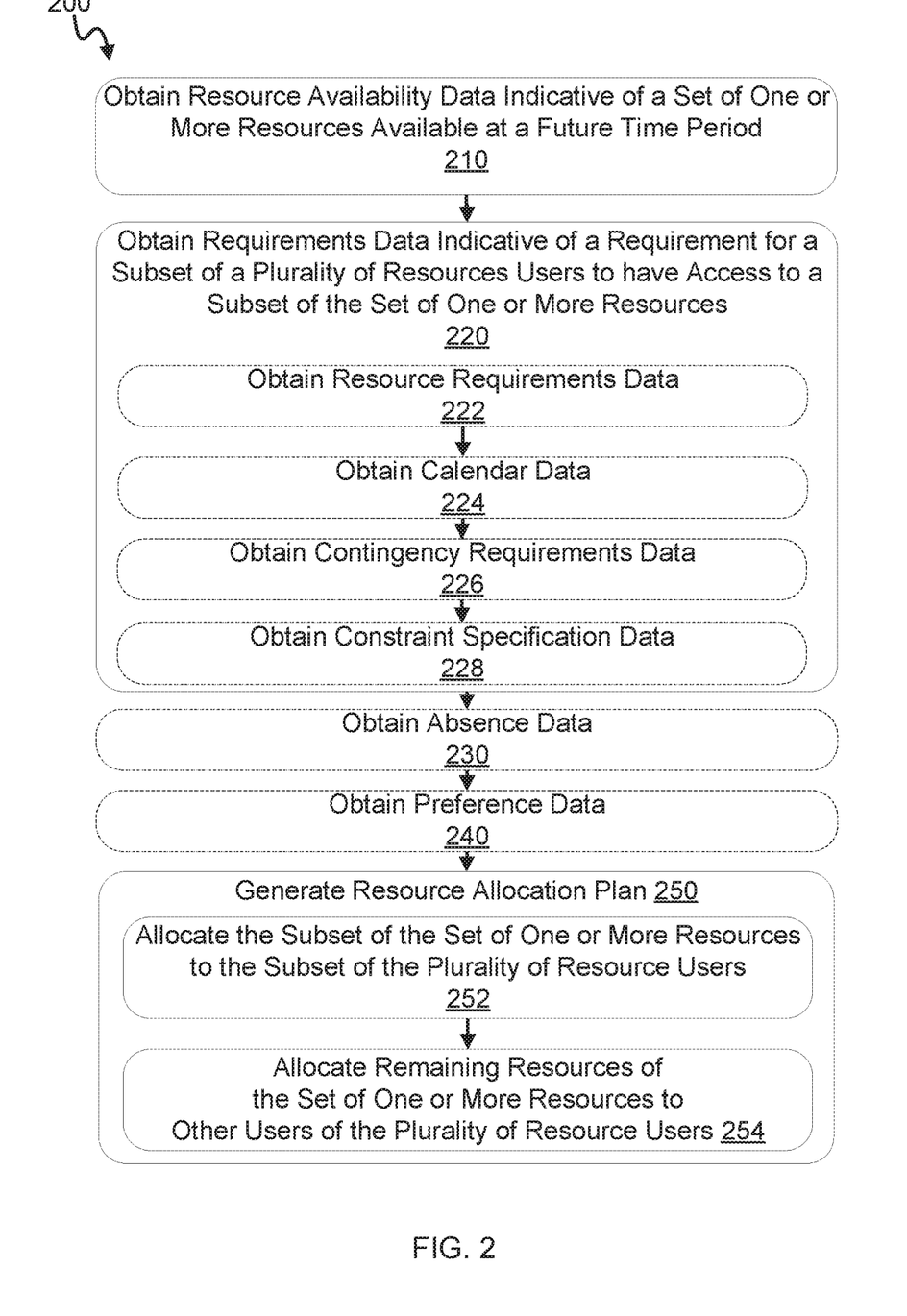
FIG. 2 shows a method for generating a resource allocation plan according to an embodiment.

FIG. 2 illustrates an example method 200 for generating a resource allocation plan. The example method may be implemented as one or more computer-executable instructions executed on one or more computing devices, e.g. the computing device 500 described in relation to FIG. 5. The example method may be performed by the resource allocation engine 190 described with respect to FIG. 1. Optional steps are indicated via dashed lines.

At step 210, resource availability data indicative of a set of one or more resources available at a future time period is obtained. The resource availability data may be obtained using any suitable data retrieving and/or receiving mechanism. For example, the resource availability data may be retrieved from a database and/or file store, or the resource availability data may be received from a resource availability data service over a network. The obtained resource availability data may include: information about the types of resources available in the set of one or more resources; information about amounts of each of the types of resources available in the set of one or more resources; information about the locations of each and/or groups of resources in the set of one or more resources; and/or specific properties for each and/or groups of resources in the set of one or more resources. The resources may be of any of the types and have any of the properties previously described in relation to the resource availability data included in the resource availability data repository 172.

At step 220, requirements data indicative of a requirement for a subset of a plurality of resource users to have access to a subset of the set of the one or more resources is obtained. This requirements data may specify requirements at least for the future time period. The requirements data may be obtained using any or any combination of suitable data retrieving and/or receiving mechanism, such as those described in relation to step 210.

Obtaining the requirements data may include a step 222 of obtaining resource requirements data. The resource requirements data indicates requirements for a first one or more resource users of the subset of the plurality of resource users to have access to specified resources of the subset of the set of one or more resources. These requirements may be static requirements or dynamic requirements as described in relation to the resource requirements data included in the resource requirements data 152.

Obtaining the requirements data may include a step 224 of obtaining calendar data. The calendar data may be obtained from a data store associated with a calendar service and/or application. The calendar data includes data indicating an obligation for a second one or more users of the subset of the plurality of resource users to be proximate to a resource location. As these users have an obligation to be at the resource location, there is a requirement to allocate these second one or more users resources proximate to that resource location.

Obtaining the requirements data may include a step 226 of obtaining contingency requirements data. The contingency requirements data may specify an amount and/or proportion of the set of one or more resources that should be left unallocated as contingency resources at the future time period. The contingency requirements data may be part of contingency specification data, e.g. contingency specification data 186.

The obtained contingency requirements data may be the relevant part of the contingency specification data for the future time period, e.g. the part of the contingency specification data relevant to the length of time between the current time and the future time period.

Obtaining the requirements data may include a step 228 of obtaining constraint specification data. The constraint specification data indicates rules and/or other criteria that a resource allocation plan must satisfy. Examples of constraint specification data are described in relation to the constraint specification data 186.

At step 230, absence data may be obtained. The absence data indicates that one or more users do not require or desire resources in general and/or proximate to a given resource location. The absence data may be user-specific absence data and/or generic absence data as described in relation to the absence data in the absence data repository 176.

At step 240, preference data may be obtained. The preference data indicates for at least one or more other resource users of the plurality of users whether the respective resource user desires one or more resources of the at least a portion of remaining resources of the set of resources at the future time period. For example, the at least one or more other resource users may have a preference for resources, such as a desk/workspace, at a resource location, such as an office or a particular floor or section thereof, to be allocated to them but may be able to perform their role remotely without these resources.

At step 250, a resource allocation plan is generated based on the requirements data; if absence data has been obtained, the absence data; and, if preference data has been obtained, the preference data. Generating the resource allocation plan may include allocating the set of one or more resources available at the future time period to the plurality of resource users such that the requirements specified by the requirements data are fulfilled; where absence data has been obtained, removing, preventing or changing certain allocations based on the absence data, and, where preference data has been obtained, the desires for resources indicated in the preference data are accounted for, to the extent feasible. Furthermore, one or more optimization goals, e.g. optimization goal specified in optimization specification data, may be optimized for. It should be noted that, due to the computational complexity of calculating a resource allocation plan that is maximally optimized in accordance with the requirements data, the preference data and/or the one or more optimization goals, the resource allocation plan may instead be approximately optimized in accordance with the desires for resources, e.g. using a less computationally complex heuristic algorithm. The generated resource allocation plan may be stored, e.g. in a database or as a file, and/or may be output for use by an application.

Generating the resource allocation plan includes a step 252 of allocating the subset of the set of one or more resources to the subset of the plurality of resource users. This allocation is based on the requirements data ensuring that the subset of the plurality of resource users who require resources are given priority and therefore assigned resources first. The allocation may first include allocating to the first one or more resource users of the subset of the plurality of resource users to have access to the specified resources of the subset of the set of one or more resources. The allocation may then include allocating to the second one or more resource users required resources of the subset of the set of one or more resources that are proximate to the resource location at which the second one or more resource users have an obligation to be located. The allocation may then include allocating as contingency, e.g. deliberately leaving unallocated, the proportion or amount of the set of one or more resources based on the contingency requirements data. This contingency proportion or amount of the set of one or more resources may form part of the subset of the set of one or more resources.

Generating the resource allocation plan includes a step 254 of allocating remaining resources of the set of one or more resources to other users of the plurality of resource users. The allocation may be based on the preference data, such that, where possible, the other users of the plurality of resource users are allocated resources that they desire. For example, a resource user that has a desire to work in the office, but can work remotely from home, may be allocated a desk/workspace in the office based on the preference data. The allocation of the remaining resources may alternatively or additionally involve allocating the remaining resources in a way that optimizes the one or more optimization goals.

Resource Allocation Preference Data Collection Method

Figure 3:
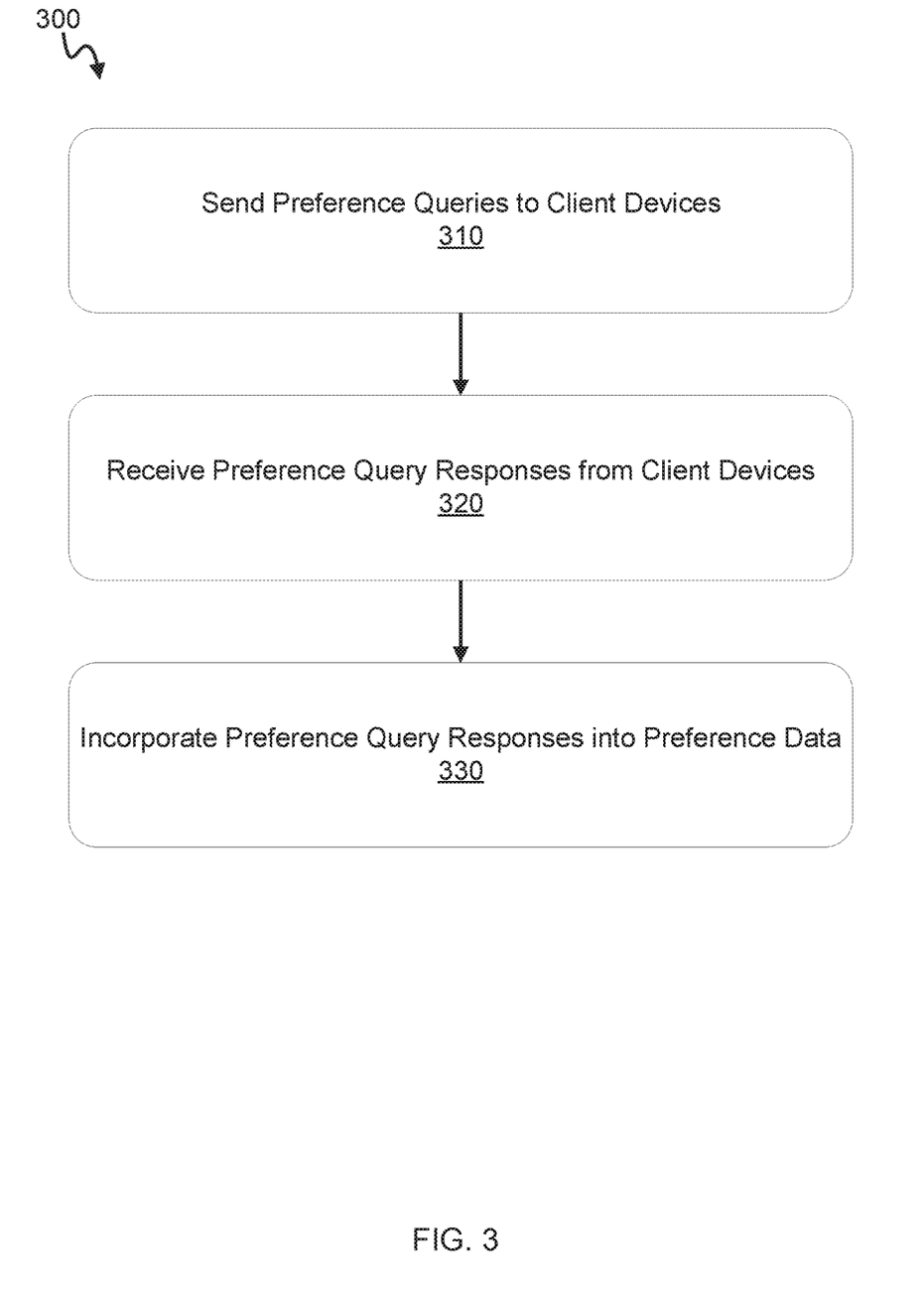
FIG. 3 shows a method for collecting resource allocation preference data according to an embodiment.

FIG. 3 illustrates an example method 300 for collecting preference data from resource users. The example method may be implemented as one or more computer-executable instructions executed on one or more computing devices, e.g. the computing device 500 described in relation to FIG. 5.

In step 310, preference queries are sent to client devices of the plurality of resource users. The preference queries may be communicated using a web interface, e.g. web interface 132; an app interface, e.g. app interface 134; or a text interface, e.g. text interface 136. In response to receiving preference queries through one of these interfaces, the client devices may display the preference query or a representation thereof. Interface elements and/or text representing the preference query may be displayed on a display incorporated into or associated with the client device. For example, a web page displaying the preference query may be shown in a browser application; app user interface elements including the preference query may be shown in an app; or a textual message including the preference query may be shown in a messaging application. An example of a preference query may be a question to the resource users as to whether they would prefer to work in the office in a given time period. The preference query may request a binary (e.g. yes or no) response, a qualitative response, or a quantitative response (e.g. a numerical indication of the strength of the preference)

In step 320, preference query responses are received from the client devices. The received preference query responses may be sent from the client devices based on input by the resource users to the client devices. For example, the resource user may make a web page input, click on an app user interface element, or type a message indicating their response to the preference query, and, in response to this input, the preference query responses may be sent.

In step 330, the received preference query responses are incorporated into preference data, e.g. preference data stored in a database for use by a resource allocation engine. For users who have not previously provided a response to the preference query, incorporating the preference query responses may include adding the preference query response for that user to the preference data. For users who have provided a response to the preference query before, but where this response has changed, incorporating the received preference query may include updating a previous preference query response stored in the preference data.

Resource Allocation Plan Updating Method

Figure 4:
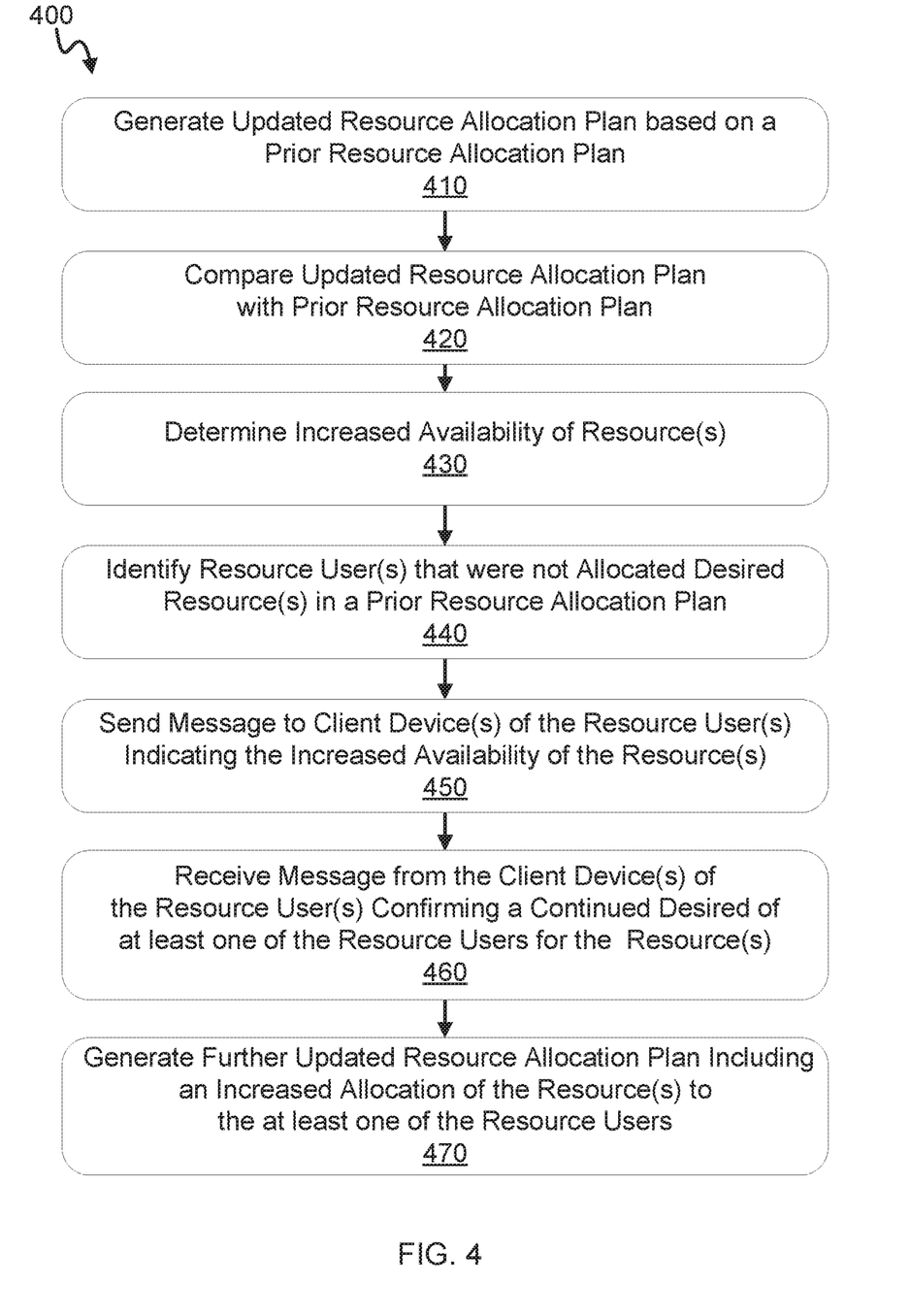
FIG. 4 shows a method for updating a resource allocation plan according to an embodiment.

FIG. 4 illustrates an example method 400 for updating a resource allocation plan. The example method may be implemented as one or more computer-executable instructions executed on one or more computing devices, e.g. the computing device 500 described in relation to FIG. 5.

In step 410, an updated resource allocation plan is generated for a future time period based on a prior resource allocation plan for the future time period. The updated resource allocation plan may be generated according to the resource allocation plan generation method 200. However, the generation of the updated resource allocation plan based on the prior resource allocation plan may differ as one or more aspects of the prior resource allocation plan may have become fixed such that they cannot be changed in the updated resource allocation plan.

In step 420, the updated resource allocation plan and the prior resource allocation plan are compared. The comparison may include determining differences in quantities of available and unallocated resources between the updated resource allocation plan and the prior resource allocation plan.

In step 430, it is determined that there is an increased availability of one or more resources based on the comparison of the updated resource allocation plan and the prior resource allocation plan. There may be an increased availability of one or more resources due to a change in requirements, e.g. in resource requirements or in obligations for given resource users to be at given resource locations. Alternatively or additionally, there may be an increased availability because the amount or proportion of the one or more resources to be reserved as contingency may be less at the time at which the updated resource allocation plan than when the prior resource allocation plan was generated. For example, the prior resource allocation plan may have been generated a month before the future time period, where the contingency requirement was 30% of the one or more resources, while the updated resource allocation plan may be being generated a week before the future time period, where the contingency requirement is 10% of the one or more resources.

In step 440, resource users who desired the one or more resources, of which there is an increased availability, but who were not allocated these resources in the prior resource allocation plan are identified. These one or more resource users may be determined based on the preference data and the prior resource allocation plan.

In step 450, one or more messages are sent to client devices of the resource users indicating that there is an increased availability of the one or more resources that they desired but were not previously allocated. These one or more messages may be in any suitable form, e.g. text messages, messaging application messages, emails, or an app notification.

In step 460, one or messages are received from a client device of at least one of the resource users confirming a continued desire of the at least one of the resource users for the one or more resources. The received message may be a message from a messaging application, a text message, an email or a message from an app sent in response to a user input confirming their continued desire for the one or more resources. Such a confirmation from resource users may be important, as users' preferences may have changed. For example, a user may have desired a desk/workspace in the office but having previously not been allocated a desk/workspace in the office has made arrangements dependent on working from home at the future time period. Therefore, the user may no longer desire a desk/workspace in the office at the future time period.

In step 470, a further updated resource allocation plan is generated. In response to the confirmation of the continued desire of the at least one of the resource users for the one or more resources, the further updated resource allocation plan includes an increased allocation of the one or more resources to the at least one of the resource users.

Figure 5:
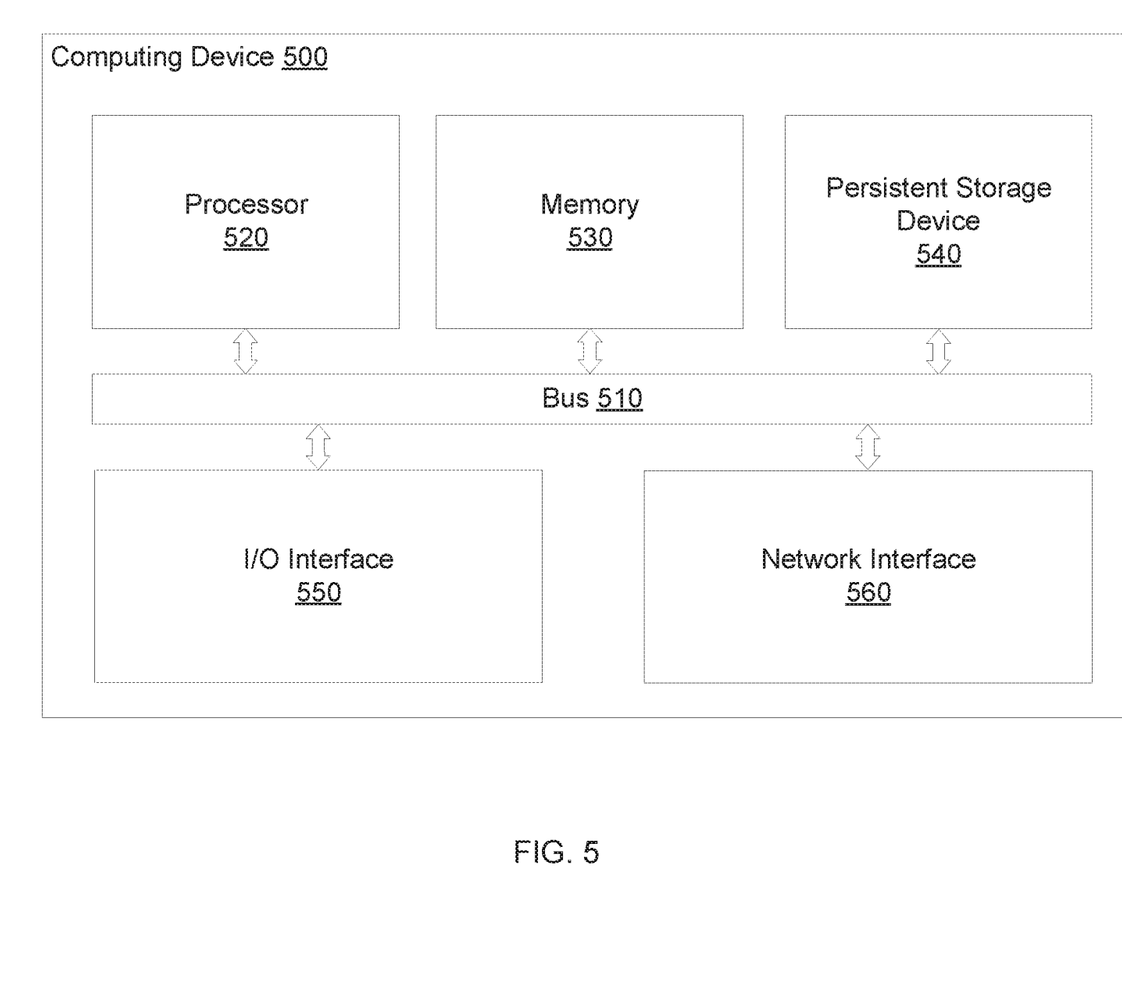
FIG. 5 shows a computing device using which the embodiments described herein may be implemented.

The method of FIG. 4 may be implemented repeatedly, (e.g. on a periodic basis or in immediate succession). For instance, the method may be implemented repeatedly, assigning resources in order of a predefined user priority. Step 440 may identify a set of highest priority resource users that have, so far, not been allocated desired resources. If further resources remain after this subset of resource users has responded and had appropriate resources allocated, then the method may repeat to send further message(s) to further resource users to attempt to allocate the remaining resources. This may be implemented in descending order of resource user priority (e.g. based on each resource user being assigned a corresponding priority value or based on predefined groups of resource users that are assigned corresponding priorities, e.g. a high priority group, a medium priority group and a low priority group), Computing Device FIG. 5 shows a computing device 500 using which the embodiments described herein may be implemented.

The computing device 500 includes a bus 510, a processor 520, a memory 530, a persistent storage device 540, an Input/Output (I/O) interface 550, and a network interface 560.

The bus 510 interconnects the components of the computing device 500. The bus may be any circuitry suitable for interconnecting the components of the computing device 500. For example, where the computing device 500 is a desktop or laptop computer, the bus 510 may be an internal bus located on a computer motherboard of the computing device. As another example, where the computing device 500 is a smartphone or tablet, the bus 510 may be a global bus of a system on a chip (SoC).

The processor 520 is a processing device configured to perform computer-executable instructions loaded from the memory 530. Prior to and/or during the performance of computer-executable instructions, the processor may load computer-executable instructions over the bus from the memory 530 into one or more caches and/or one or more registers of the processor. The processor 520 may be a central processing unit with a suitable computer architecture, e.g. an x86-64 or ARM architecture. The processor 520 may include or alternatively be specialized hardware adapted for application-specific operations.

The memory 530 is configured to store instructions and data for utilization by the processor 520. The memory 530 may be a non-transitory volatile memory device, such as a random access memory (RAM) device. In response to one or more operations by the processor, instructions and/or data may be loaded into the memory 530 from the persistent storage device 540 over the bus, in preparation for one or more operations by the processor utilizing these instructions and/or data.

The persistent storage device 540 is a non-transitory non-volatile storage device, such as a flash memory, a solid-state disk (SSD), or a hard disk drive (HDD). A non-volatile storage device maintains data stored on the storage device after power has been lost. The persistent storage device 540 may have a significantly greater access latency and lower bandwidth than the memory 530, e.g. it may take significantly longer to read and write data to/from the persistent storage device 540 than to/from the memory 530. However, the persistent storage 540 may have a significantly greater storage capacity than the memory 530.

The I/O interface 550 facilitates connections between the computing device and external peripherals. The I/O interface 550 may receive signals from a given external peripheral, e.g. a keyboard or mouse, convert them into a format intelligible by the processor 520 and relay them onto the bus for processing by the processor 520. The I/O interface 550 may also receive signals from the processor 520 and/or data from the memory 530, convert them into a format intelligible by a given external peripheral, e.g. a printer or display, and relay them to the given external peripheral.

The network interface 560 facilitates connections between the computing device and one or more other computing devices over a network. For example, the network interface 560 may be an Ethernet network interface, a Wi-Fi network interface, or a cellular network interface.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for allocating two or more physical spaces to a plurality of resource users, the method comprising:

using a data interface to load resource availability data and resource location data into a database from a resource availability data repository, wherein the resource availability data comprises information indicative of a set of one or more physical spaces available at a future time period, wherein the resource location data is indicative of a location of the set of the one or more physical spaces, wherein the set of one or more physical spaces are allocable to the plurality of resource users;

obtaining requirements data from the database, the requirements data comprising:

resource requirements data and contingency requirement data, wherein the resource requirements data is indicative of a requirement for a first subset of the plurality of resource users to have access to a first subset of the set of one or more physical spaces, and wherein the resource requirements data comprises:
  first resource requirements data indicative of a requirement for each of a first one or more resource users of the first subset of the plurality of resource users to have access to a respective specified one or more physical spaces of the first subset of the set of one or more physical spaces;
  wherein the contingency requirements data is indicative of an amount or proportion of the set of one or more physical spaces to be reserved as contingency physical spaces for the future time period, wherein the amount or proportion of the set of one or more physical spaces that are to be reserved as contingency physical spaces at the future time period decreases as a length of time between a current time and the future time period decreases;
generating a resource allocation plan for the future time period based on the resource availability data and the requirements data, wherein generating the resource allocation plan comprises:
  retrieving the resource availability data from the database;
  allocating, to the first subset of the plurality of resource users, the first subset of the set of one or more physical spaces, wherein the allocating comprises:
    allocating, to each of the first one or more resource users of the first subset of the plurality of resource users, the respective specified one or more physical spaces of the first subset of the set of one or more physical spaces;
  allocating the amount or proportion of the set of one or more physical spaces as contingency physical spaces; and
  using a resource allocation engine to allocate, to one or more other resource users of the plurality of resource users, at least a portion of the physical spaces remaining from the set of one or more physical spaces;
updating the resource availability data in the database based on the resource allocation plan; and
at least once before the future time period, using the resource allocation engine to decrease the amount or proportion of the set of one or more physical spaces allocated as contingency physical spaces such that the amount or proportion of the set of one or more physical spaces that are reserved as contingency physical spaces at the future time period decreases as the length of time between the current time and the future time period decreases.

2. The computer-implemented method of claim 1, wherein the requirements data comprises calendar data indicative of an obligation for a second one or more resource users of the first subset of the plurality of resource users to be proximate to the resource location, and wherein allocating the first subset of the set of one or more physical spaces comprises:
  allocating, to the second one or more resource users of the first subset of the plurality of resource users, at least a portion of the physical spaces remaining from the first subset of the set of one or more physical spaces.

3. The computer-implemented method of claim 1, wherein the requirements data comprises constraint specification data indicating one or more resource allocation plan constraints, and wherein generating the resource allocation plan comprises satisfying the one or more resource allocation plan constraints.

4. The computer-implemented method of claim 3, wherein the one or more resource allocation plan constraints comprise one or more maximum occupancy rules.

5. The computer-implemented method of claim 1, wherein generating the resource allocation plan comprises optimizing the resource allocation plan in accordance with one or more optimization criteria.

6. The computer-implemented method of claim 1, further comprising:
  obtaining preference data indicating, for each resource user of the one or more other resource users, an indicator as to whether the respective resource user desires one or more physical spaces of the at least a portion of the remaining physical spaces of the set of one or more physical spaces at the future time period,
  and wherein allocating the at least a portion of the remaining physical spaces of the set of one or more physical spaces is based on the preference data.

7. The computer-implemented method of claim 6, wherein the preference data comprises one or more preference query responses received from a client device of at least one of the resource users in response to one or more preference queries sent to the client device.

8. The computer-implemented method of claim 1, further comprising:
  receiving, from a client device of a resource user of the plurality of resource users, a request for resource allocation information; and
  sending, to the client device, at least a portion of the resource allocation plan.

9. The computer-implemented method of claim 8, wherein the at least a portion of the resource allocation plan comprises the resource allocation for the resource user.

10. The computer-implemented method of claim 1, further comprising:
  generating, based on the resource allocation plan, an updated resource allocation plan for the future time period;
  comparing the updated resource allocation plan with the resource allocation plan;
  determining, based on the comparison of the updated resource allocation plan with the resource allocation plan, an increased availability of one or more physical spaces;
  identifying at least one of the one or more other resource users desiring the one or more physical spaces that were not allocated the one or more physical spaces in the resource allocation plan; and
  sending, to a client device of the at least one of the one or more other resource users, a message indicating the increased availability of the one or more physical spaces.

11. The computer-implemented method of claim 10, further comprising:
  receiving, from the client device of the at least one of the one or more other resource users, a message confirming a continued desire for the one or more physical spaces; and
  in response to receiving the message, generating a further updated resource allocation plan for the future time period, wherein there is an increased allocation of the one or more physical spaces to the at least one of the one or more resource users.

12. A computing system for allocating two or more physical spaces to a plurality of resource users, the system comprising one or more computing devices, wherein the one or more computing devices comprise one or more processors configured to:
- use a data interface to load resource availability data and resource location data into a database from a resource availability data repository, wherein the resource availability data comprises information indicative of a set of one or more physical spaces available at a future time period, wherein the resource location data is indicative of a location of the set of the one or more physical spaces, wherein the set of one or more physical spaces are allocable to the plurality of resource users;
- obtain requirements data from the database, the requirements data comprising:
  - resource requirements data and contingency requirement data, wherein the resource requirements data is indicative of a requirement for a first subset of the plurality of resource users to have access to a first subset of the set of one or more physical spaces, wherein the resource requirements data comprises:
    - first resource requirements data indicative of a requirement for each of a first one or more resource users of the first subset of the plurality of resource users to have access to a respective specified one or more resources of the first subset of the set of one or more physical spaces;
  - wherein the contingency requirements data is indicative of an amount or proportion of the set of one or more physical spaces to be reserved as contingency resources for the future time period, wherein the amount or proportion of the set of one or more physical spaces that are to be reserved as contingency resources at the future time period decreases as a length of time between a current time and the future time period decreases;
- generate a resource allocation plan for the future time period based on the resource availability data and the requirements data, wherein to generate the resource allocation plan, the one or more processors are configured to:
  - retrieve the resource availability data from the database;
  - allocate, to the first subset of the plurality of resource users, the first subset of the set of one or more physical spaces, wherein the one or more processors are configured to:
    - allocate, to each of the first one or more resource users of the first subset of the plurality of resource users, the respective specified one or more physical spaces of the first subset of the set of one or more physical spaces;
  - allocate the amount or proportion of the set of one or more physical spaces as contingency resources; and
  - use a resource allocation engine to allocate, to one or more other resource users of the plurality of resource users, at least a portion of the resources remaining from the set of one or more physical spaces;
- update the resource availability data in the database based on the resource allocation plan; and
- at least once before the future time period, use the resource allocation engine to decrease the amount or proportion of the set of one or more physical spaces allocated as contingency physical spaces such that the amount or proportion of the set of one or more physical spaces that are reserved as contingency physical spaces at the future time period decreases as the length of time between the current time and the future time period decreases.

13. The computing system of claim 12, wherein the one or more processors are further configured to:
- generate, based on the resource allocation plan, an updated resource allocation plan for the future time period;
- compare the updated resource allocation plan with the resource allocation plan;
- determine, based on the comparison of the updated resource allocation plan with the resource allocation plan, an increased availability of one or more physical spaces;
- identify at least one of the one or more other resource users desiring the one or more physical spaces that were not allocated the one or more physical spaces in the resource allocation plan; and
- send, to a client device of the at least one of the one or more other resource users, a message indicating the increased availability of the one or more physical spaces.

14. The computing system of claim 13, further comprising the client device of the at least one of the one or more other resource users.

15. The computing system of claim 14, wherein the client device is configured to:
- in response to one or more user inputs, send, to the one or more computing devices, a message confirming a continued desire for the one or more physical spaces.

16. The computing system of claim 15, wherein the one or more processors are further configured to:
- receive, from the client device, the message confirming a continued desire for the one or more physical spaces; and
- generate a further updated resource allocation plan for the future time period, wherein there is an increased allocation of the one or more physical spaces to the at least one of the one or more resource users.

17. A non-transitory computer-readable medium comprising instructions that, when executed by a processor, cause the processor to:
- use a data interface to load resource availability data and resource location data into a database from a resource availability data repository, wherein the resource availability data comprises information indicative of a set of one or more physical spaces available at a future time period, wherein the resource location data is indicative of a location of the set of the one or more physical spaces, wherein the set of one or more physical spaces are allocable to a plurality of resource users;
- obtain requirements data from the database, the requirements data comprising:
  - resource requirements data and contingency requirement data, wherein the resource requirements data indicative of a requirement for a first subset of the plurality of resource users to have access to a first subset of the set of the one or more physical spaces, wherein the resource requirements data comprises:
    - first resource requirements data indicative of a requirement for each of a first one or more resource users of the first subset of the plurality of resource users to have access to a respective specified one or more physical spaces of the first subset of the set of one or more physical spaces;
  - wherein the contingency requirements data is indicative of an amount or proportion of the set of one or more physical spaces to be reserved as contingency resources for the future time period, wherein the amount or proportion of the set of one or more physical spaces that are to be reserved as contingency resources at the future time period decreases over a period of time;

generate a resource allocation plan for the future time period based on the resource availability data and the requirements data, wherein to generate the resource allocation plan the processor is configured to:

retrieve the resource availability data from the database;

allocate, to the first subset of the plurality of resource users, the first subset of the set of one or more physical spaces, wherein the processor is configured to:

allocate, to each of the first one or more resource users of the first subset of the plurality of resource users, the respective specified one or more physical spaces of the first subset of the set of one or more physical spaces;

allocate the amount or proportion of the set of one or more physical spaces as contingency resources; and use a resource allocation engine to allocate, to one or more other resource users of the plurality of resource users, at least a portion of the resources remaining from the set of one or more physical spaces;

update the resource availability data in the database based on the resource allocation plan; and at least once before the future time period, use the resource allocation engine to decrease the amount or proportion of the set of one or more physical spaces allocated as contingency physical spaces such that the amount or proportion of the set of one or more physical spaces that are reserved as contingency physical spaces at the future time period decreases as a length of time between a current time and the future time period decreases.

18. The computer-implemented method of claim 1, wherein the resource availability data repository comprises an application-specific data store.

19. The computer-implemented method of claim 1, further comprising:

using the data interface to synchronize the one or more changes to the resource availability data back to the resource availability data repository.

\* \* \* \* \*